(12) United States Patent
Katano (10) Patent No.: US 8,317,416 B2
(45) Date of Patent: Nov. 27, 2012

(54) BARRIER DEVICE FOR CAMERA

(75) Inventor: Kenichi Katano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 578 days.

(21) Appl. No.: 12/508,069

(22) Filed: Jul. 23, 2009

(65) Prior Publication Data

US 2010/0027986 A1 Feb. 4, 2010

(30) Foreign Application Priority Data

Aug. 4, 2008 (JP) ................................. 2008-200996

(51) Int. Cl.
*G03B 17/00* (2006.01)
(52) U.S. Cl. ......................... 396/448; 396/439; 396/456
(58) Field of Classification Search .................... 396/448
See application file for complete search history.

(56) References Cited

U.S. PATENT DOCUMENTS

| 6,419,407 | B1 * | 7/2002 | Nakazawa | 396/448 |
|---|---|---|---|---|
| 6,612,755 | B1 | 9/2003 | Kamata | |
| 7,460,171 | B2 * | 12/2008 | Iida | 348/374 |
| 2007/0182825 | A1 * | 8/2007 | Nomura et al. | 348/208.99 |
| 2007/0196102 | A1 * | 8/2007 | Miyoshi | 396/448 |
| 2008/0025719 | A1 | 1/2008 | Uehara | |

FOREIGN PATENT DOCUMENTS

| JP | 2001-083575 | 3/2001 |
|---|---|---|
| JP | 2002-148682 | 5/2002 |

OTHER PUBLICATIONS

The above reference was cited in a Sep. 9, 2010 Chinese Office Action, which is enclosed with an English Translation, that issued in Japanese Patent Application No. 200910161723.9.
The above reference was cited in a Jan. 4, 2012 Chinese Office Action, which is enclosed without an English Translation, that issued in Chinese Patent Application No. 200910161723.9.

* cited by examiner

*Primary Examiner* — Edward Tso
*Assistant Examiner* — Johali Torres Ruiz
(74) *Attorney, Agent, or Firm* — Cowen, Liebowitz & Latman, P.C.

(57) ABSTRACT

A reliable barrier device for a camera, which is able to smoothly open and close blade members while suppressing a drive load applied when the blade members are opened and closed. Closing springs for primary and secondary blades are each interposed between corresponding ones of spring hooks on a barrier drive ring and on primary and secondary blade members. When the drive ring is rotated in a barrier opening direction, the distance between the spring hook on the ring and the spring hook for primary blade decreases and the urging force of the closing spring for primary blade decreases, which reduces a rotational torque produced by the closing springs for primary and secondary blades at barrier open state, making it possible to decrease a rotational torque produced by opening springs and acting on the drive ring at barrier open state.

8 Claims, 11 Drawing Sheets

BARRIER OPENING DIRECTION

BARRIER OPENING DIRECTION

BARRIER DEVICE FOR CAMERA

BACKGROUND OF THE INVENTION

1. Field of the Invention

The present invention relates to a barrier device for a camera, and more particularly, to a barrier device disposed in front of a taking lens of a camera lens barrel.

2. Description of the Related Art

In recent years, cameras have been highly automated and made compact to improve user-friendliness and functionality. Among these, some camera has a barrier device mounted in front of a taking lens of a lens barrel. Most of barrier devices include barrier blades automatically closed when the lens barrel is put into a retracted state in conjunction with operation of a zoom mechanism or a retraction mechanism.

With the progress of downsizing of camera, the lens barrel is made small in diameter, making it difficult for the barrier device with two blade members to fully cover the lens of the lens barrel. To obviate this, there has been used a barrier device with four blade members to cover the lens. The four blade members overlap one another for compact accommodation in a space of small area when the photographing opening (lens opening) is open.

Some conventional barrier device with four blade members includes barrier members openably/closably attached in front of the taking lens and a barrier drive means for opening/closing the barrier members (see, for example, Japanese Laid-open Patent Publication No. 2001-083575). The barrier members consist of two pairs of a large main blade member and a small auxiliary blade member, which are opened/closed on the same plane extending nearly perpendicular to the optical axis of the taking lens. Each auxiliary blade member is opened/closed to follow the motion of the corresponding main blade member. The barrier device further includes, as a part of the barrier drive means, spring members interposed between corresponding ones of the main and auxiliary blade members and urging them in an opening or closing direction.

Another conventional lens barrier device includes two sets of first and second barrier blades respectively pivotably supported at symmetrical positions on a ring-shaped barrier cover, springs each applying a closing force to the corresponding set of barrier blades, and cams respectively disposed at symmetrical positions on a barrier drive ring and each adapted to drive a drive pin for the corresponding set of barrier blades. Thus, the four barrier blades are independently driven to open and close on the same plane (see, for example, Japanese Laid-open Patent Publication No. 2002-148682).

The above conventional barrier devices with four blade members are configured to open/close two pairs of main and auxiliary blade members by the barrier drive means and urge the blade members in a closing direction by the spring members each disposed between the corresponding pair of blade members.

Thus, the main and auxiliary blades are held in a closed state by being urged in the barrier closing direction by the springs and put into an open state by being applied with a driving force in the barrier opening direction against the urging force of the springs.

In the conventional barrier devices with four blade members, therefore, the driving force to drive the blade members in the opening direction must be made stronger than that to drive them in the closing direction.

The two main blade members must be retained in closed positions when the four blade members are in the closed state, even if a foreign matter is pinched or if a sudden operation is made by a user. Thus, the urging force to close the main blade members must be made large.

As a consequence, especially in the barrier device with four blade members, both the drive forces acting in the blade opening and closing directions must be made strong, resulting in a fear that drive loads on the blade members become large and barrier component parts are twisted to cause an operation failure when the barrier is opened/closed.

SUMMARY OF THE INVENTION

The present invention provides a reliable barrier device for a camera, which is able to smoothly open and close blade members while suppressing a drive load applied when the blade members are opened and closed.

According to the present invention, there is provided a barrier device for a camera, which comprises first and second blade members adapted to be pivotable between closed positions to cover a lens surface and open positions to expose the lens surface, first and second engagement portions provided on a drive member which is separate from the first and second blade members, a first urging member adapted to apply the first blade member with an urging force by having one end thereof engaged with the first engagement portion and another end thereof engaged with the first blade member, and a second urging member adapted to apply the second blade member with an urging force by having one end thereof engaged with the second engagement portion and another end thereof engaged with the second blade member, wherein the first and second engagement portions are movable relative to the first and second blade members.

With this invention, a highly reliable barrier device for a camera can be provided while suppressing occurrences of blade member opening/closing failure and operation failure due to the increase in drive load applied when blade members are opened and closed.

Further features of the present invention will become apparent from the following description of an exemplary embodiment with reference to the attached drawings.

DETAILED DESCRIPTION OF THE PREFERRED EMBODIMENT

The present invention will now be described in detail below with reference to the drawings showing a preferred embodiment thereof.

Figure 1:
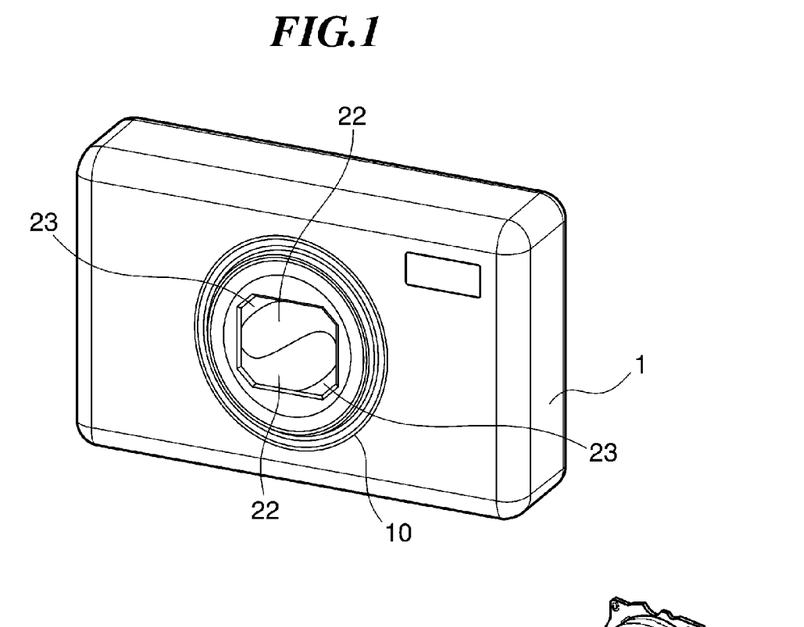
FIG. 1 is a perspective view of a camera having a barrier device according to one embodiment of this invention.

FIG. 1 shows in perspective view a camera mounted with a barrier device according to one embodiment of this invention.

In FIG. 1, reference numeral 1 denotes a camera body having a front surface, near the center of which a lens barrel 10 is disposed. The lens barrel 10 constitutes a part of a camera main unit, and includes primary and secondary blade members 22, 23 described later.

Figure 2:
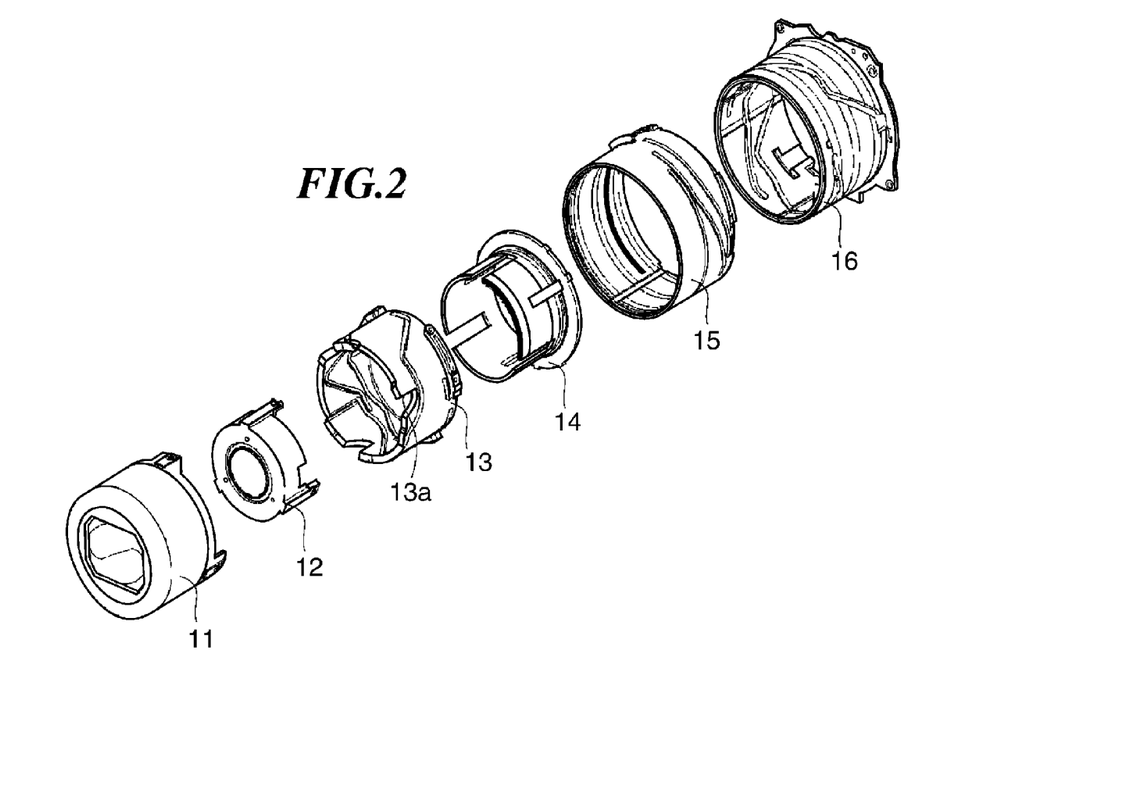
FIG. 2 is an exploded perspective view schematically showing the construction of a lens barrel of the camera.

FIG. 2 schematically shows the construction of the lens barrel 10 in exploded perspective view.

In FIG. 2, reference numeral 11 denotes a first-group cylinder that holds a lens group, 12 denotes a second-group lens holder that holds another lens group, 13 denotes a cam cylinder with barrier driving portions 13a, and 14 denotes a rectilinear guide cylinder. In conjunction with a zoom operation, the cylinders 13, 14 respectively move the first-group cylinder 11 and the second-group lens holder 12 in an optical axis direction.

Reference numeral 15 denotes a drive cylinder adapted, when driven by a drive source (not shown), to convey a rotational drive force to the cam cylinder 13. Reference numeral 16 denotes a fixed cylinder that holds the cylinders of the lens barrel 10.

In addition to the components shown in FIG. 2, the lens barrel 10 includes an AF lens group, a drive mechanism, etc. of ordinary construction (none of which are illustrated and described). Namely, the lens barrel 10 is a retracted-type lens barrel of ordinary construction.

Figure 3:
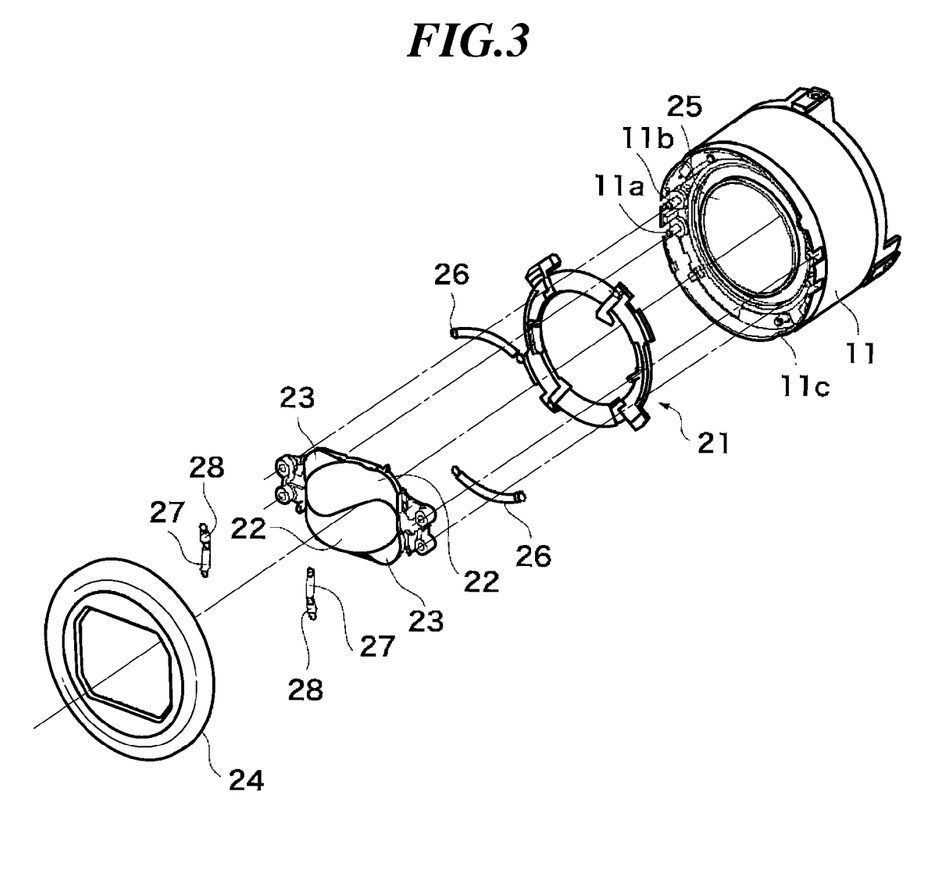
FIG. 3 is an exploded perspective view showing a barrier mechanism attached to a first-group cylinder of the lens barrel and constituting an essential part of the barrier device.

The barrier device of this embodiment includes a barrier mechanism shown in FIG. 3, which is attached to a front face of the first-group cylinder 11 of the lens barrel 10 for lens protection when the lens barrel 10 is in a retracted state.

FIG. 3 shows the construction of the barrier mechanism of this embodiment in exploded perspective view.

In FIG. 3, reference numeral 21 denotes a barrier drive ring mounted for rotation in conjunction with a retracting/ejecting operation of the lens barrel 10. Namely, the drive ring 21 is attached to the front face of the first-group cylinder 11 for rotation with rotation of the cam cylinder 13. Spring hooks 21b (FIG. 4) are projectingly provided at two diametrically opposed places on the drive ring 21, whereas spring engagement portions 11c are projectingly provided correspondingly at two diametrically opposed places on the front face of the first-group cylinder 11.

Opening springs 26, which are tension coil springs, are each disposed between corresponding ones of the spring engagement portions 11c of the cylinder 11 and the spring hooks 21b of the ring 21.

Figure 4:
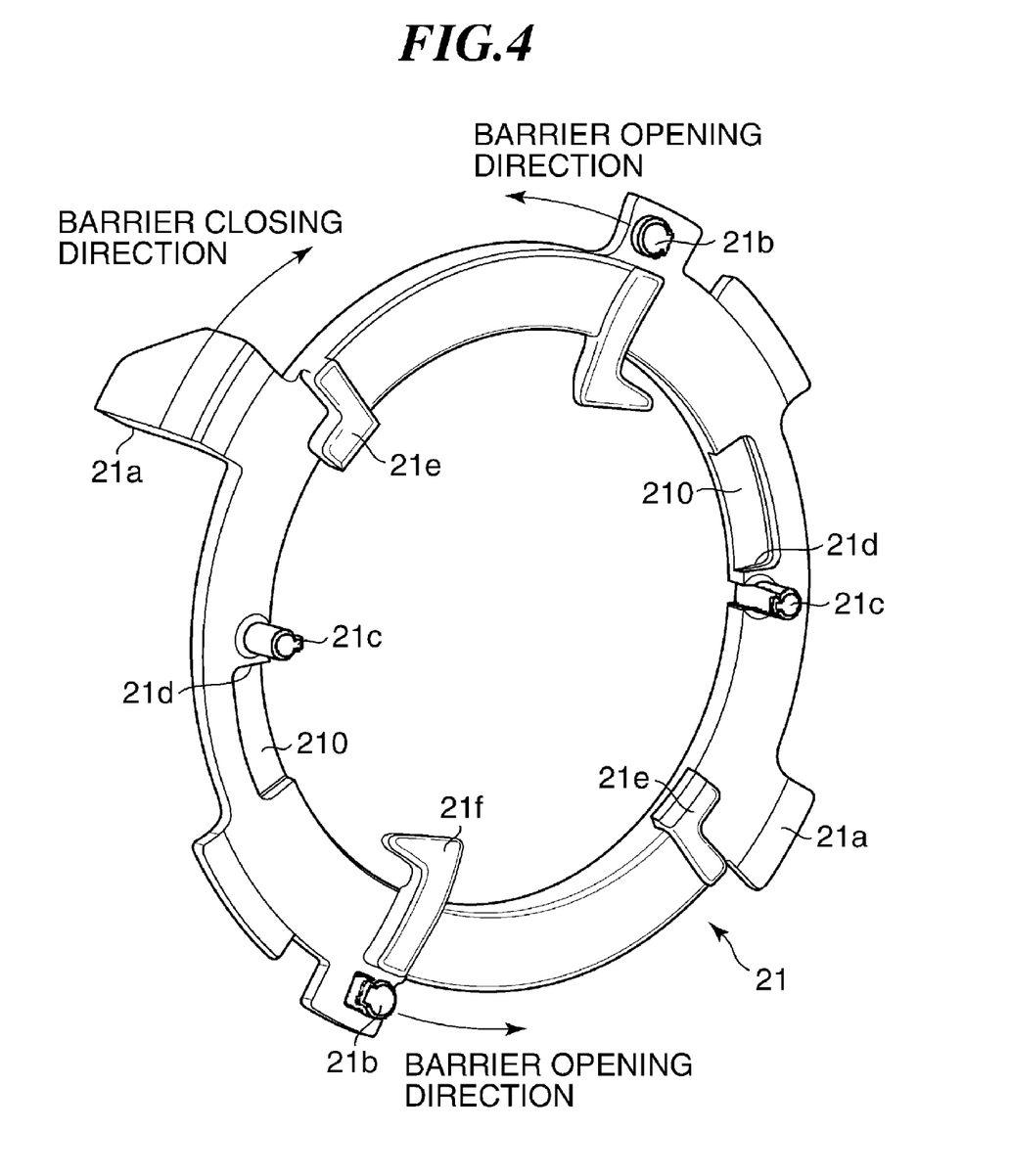
FIG. 4 is an enlarged perspective view of a barrier drive ring of the barrier mechanism.

The barrier drive ring 21 is applied by the opening springs 26 with a rotating force acting in barrier opening direction (anticlockwise direction in FIG. 4).

The primary blade members 22 have the same shape as each other, and the secondary blade members 23 have the same shape as each other. Two sets of the blade members 22, 23 are configured to cover a front surface of a lens group 25 when the lens barrel 10 is in a retracted state. Specifically, the primary blade members 22 are provided at their proximal ends with pivot-supporting portions each formed with a pivot hole into which a corresponding one of pivots 11a projectingly formed on the front surface of the first-group cylinder 11 is inserted. Thus, each primary blade member 22 is rotatable about the pivot 11a so as to be opened and closed.

Similarly, the secondary blade members 23 are provided at their proximal ends with pivot-supporting portions each formed with a pivot hole into which a corresponding one of pivots 11b projectingly formed on the front surface of the first-group cylinder 11 is inserted, whereby each secondary blade member 23 is rotatable about the pivot 11b so as to be opened and closed.

The primary and secondary blade members 22, 23 are respectively urged in a barrier closing direction by closing springs 27 and 28, which are tension coil springs.

Reference numeral 24 denotes a barrier cover that restricts the blade members 22, 23 from moving in the optical axis direction and forms an exterior of the lens barrel 10.

Next, with reference to FIGS. 4 to 6, a description will be given of the construction to open and close the blade members 22, 23 of the lens barrel 10.

FIG. 4 shows the barrier drive ring 21 of the barrel mechanism in enlarged perspective view.

Figure 5:
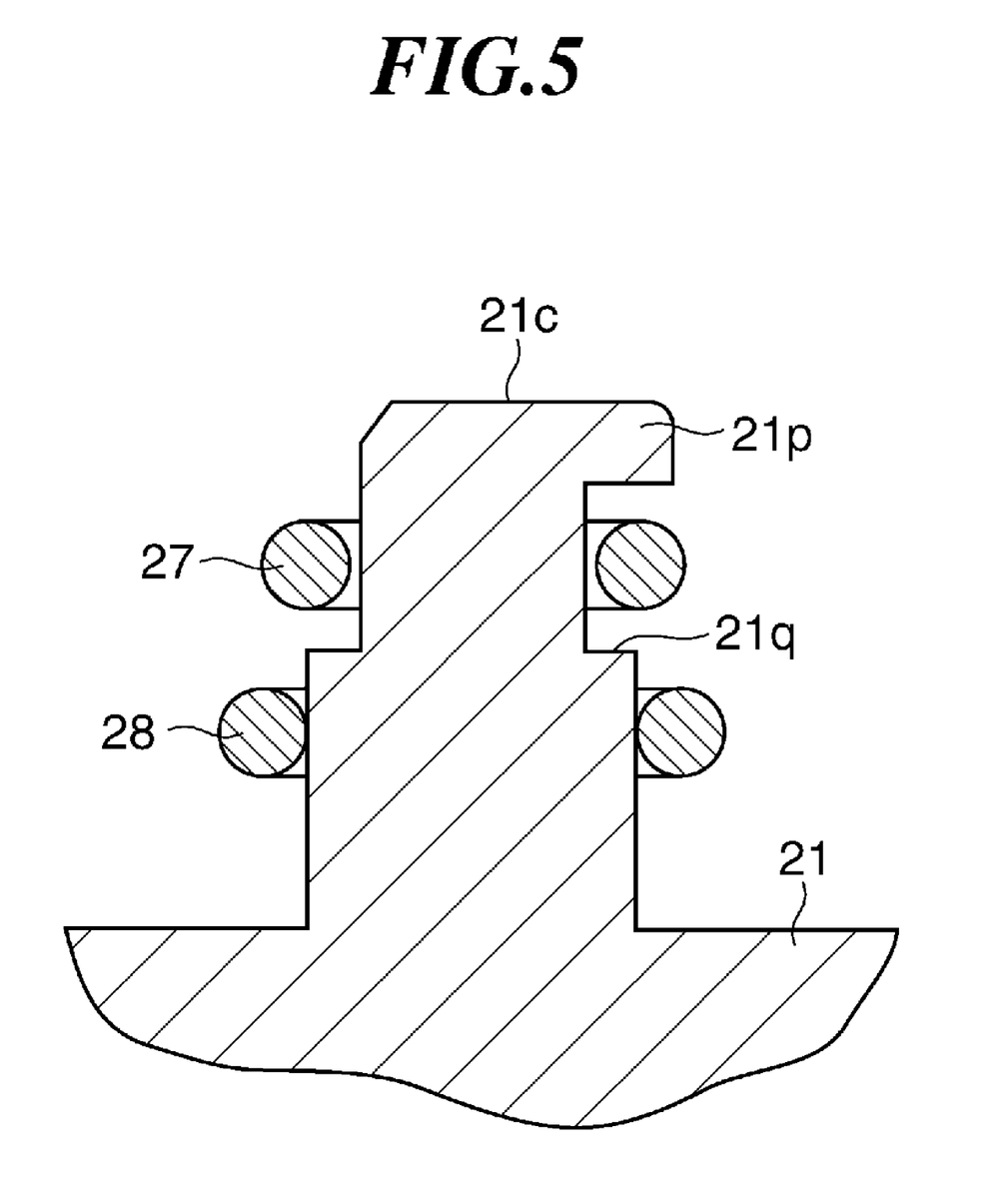
FIG. 5 is a fragmentary enlarged section view showing a spring hook of the barrier drive ring.

FIG. 5 shows a spring hook 21c of the barrier drive ring 21 in cross section.

Figure 6:
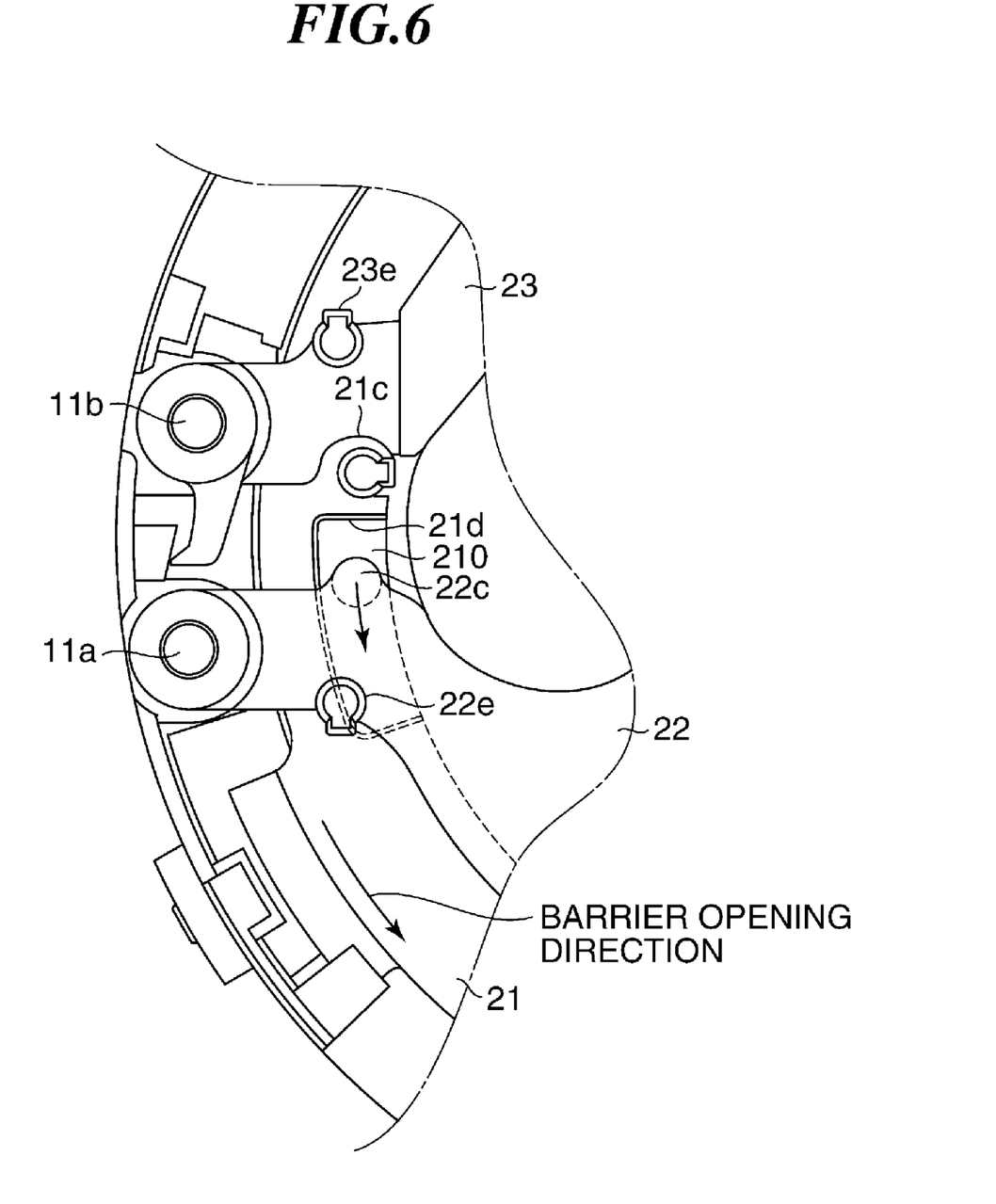
FIG. 6 is a fragmentary enlarged front view showing a part of the barrier drive ring to which primary and secondary blade members are pivotally attached.

FIG. 6 shows in enlarged front view a part of the barrier drive ring 21 to which the blade members 22, 23 are pivotally attached.

As shown in FIG. 4, the barrier drive ring 21 is formed into an circular annular shape and integrally formed with interlocking manipulation tabs 21a. The manipulation tabs 21a respectively extend radially outward from two places on an outer peripheral surface of the barrier drive ring 21 and are bent into an L-shape as seen in side view.

When the lens barrel 10 is retracted, barrier driving portions 13a (FIG. 2) on the front side (object side) of the cam cylinder 13 are made in contact with the manipulation tabs 21a, and rotate the barrier drive ring 21 in the barrier closing direction (clockwise direction in FIG. 4) against urging forces of the opening springs 26 acting in barrier opening direction.

Specifically, at the retracting operation of the lens barrel 10, the barrier driving portions 13a of the camera cylinder 13 are rotated by a rotational driving force conveyed from the drive source, and the driving portions 13a push the manipulation tabs 21a to rotate the barrier drive ring 21 in the barrier closing direction.

Spring hooks 21c are projectingly formed on the barrier drive ring 21 at locations circumferentially apart from the spring hooks 21b by a predetermined distance. As shown in FIG. 5, each spring hook 21c is formed to enable two closing springs 27, 28 to be simultaneously engaged therewith. The spring hook 21c has a large-diameter shaft portion thereof extending from its lower end to its intermediate portion and a small-diameter shaft portion thereof extending upward from the large-diameter shaft portion, with a step portion 21q formed between these two shaft portions.

Further, a projecting latch portion 21p is formed at a free end of the spring hook 21c to extend radially outward therefrom.

The small-diameter shaft portion of the spring hook 21c functions as a first engagement portion to which the closing spring 27 for primary blade is engaged, whereas the large-diameter shaft portion functions as a second engagement portion to which the closing spring 28 for secondary blade is engaged. It should be noted that the first and second engagement portions can be formed at different places on the barrier drive ring 21.

One end of the closing spring 28 for secondary blade is engaged with the lower large-diameter shaft portion of the spring hook 21c, and one end of the closing spring 27 for primary blade is engaged with the upper small-diameter shaft portion of the hook 21c. Thus, respective one ends of the two closing springs 27, 28 are simultaneously engaged with the spring hook 21c.

The closing spring 28 for secondary blade engaged with the spring hook 21c is prevented by the projecting latch portion 21p from being detached from the free end of the spring hook 21c. In addition, the closing spring 28 engaged with the hook 21c is restricted by the closing spring 27 for primary blade from vertically moving, thereby prevented from being detached from the hook 21c.

As shown in FIG. 4, the barrier drive ring 21 is formed with rails 21e, 21f at its circumferential portions near the manipulation tabs 21a and the spring hooks 21b. These rails 21e, 21f restrict positions of the primary and secondary blade members 22, 23 in the optical axis direction.

As shown in FIGS. 4 and 6, the barrier drive ring 21 is formed with relative movement permission portions 210 of a rectangular groove shape, each of which extends over a predetermined range at a location near the corresponding spring hook 21c. Contact surfaces 21d are each formed at one groove end, adjacent to the hook 21c, of a corresponding one of the relative movement permission portions 210.

When the drive ring 21 is pivoted in the barrier opening direction, the contact surfaces 21d are made in contact with drive pins 22c of the primary blade members 22 and convey a pivotal motion of the ring 21 to the primary blade members 22, whereby a barrier opening operation is carried out.

Specifically, the drive pins 22 of the primary blade members 22 are each loosely fitted into and movable in a corresponding one of the grooves of the relative movement permission portions 210. Thus, the barrier drive ring 21 is movable relative to the primary blade members 22 in a range between the opposite groove ends of each movement permission portion 210.

As shown in FIGS. 6 to 9, the primary blade members 22 are each provided with a spring hook 22e to which the closing spring 27 is engaged, and the secondary blade members 23 are each provided with a spring hook 23e to which the closing spring 28 is engaged.

The primary and secondary blade members 22, 23 are respectively attached for pivotal motion to the pivots 11a, 11b of the first-group cylinder 11, and the barrier drive ring 21 is also attached to the cylinder 11. In that state, the spring hooks 21c of the drive ring 21 are each disposed near the center between the spring hooks 22e, 23e of the corresponding primary and second blade members 22, 23. Thus, each spring hook 21c is interposed between the spring hooks 22e, 23e.

Each closing spring 27 is attached to and between the corresponding spring hook 22e of the primary blade member 22 and the corresponding spring hook 21c of the drive ring 21. Also, each closing spring 28 is attached to and between the spring hook 21c of the ring 21 and the spring hook 23e of the secondary blade members 23.

With the above construction, during the barrier opening/closing operation, one of each closing spring pair 27, 28 is contracted when the other is elongated, and one of them is elongated when the other is contracted.

In the following, a description will be given of how the barrier device having the above construction is assembled.

First, the lens group 25 is joined to the first-group cylinder 11, the barrier drive ring 21 is mounted to the cylinder 11, and the two opening springs 26 are attached to and between the cylinder 11 and the ring 21.

Next, two sets of primary and secondary blade members 22, 23 are pivotably attached to the pivots 11a, 11b of the first-group cylinder 11, respectively.

Next, the closing springs 27 are attached to and between corresponding ones of the spring hooks 22e, 21c of the primary blade members 22 and the barrier drive ring 21.

Next, the closing springs 28 are attached to and between corresponding ones of the spring hooks 21c, 23e of the ring 21 and the secondary blade members 23.

Finally, the barrier cover 24 is attached, whereby the assembly of the barrier device is completed.

During the assembly of the barrier device, all the component parts can be attached in sequence to the lens barrel 10 from the object side.

In the following, useful means of the barrier device constructed as described above will be described with reference to FIGS. 7 to 10.

Figure 7:
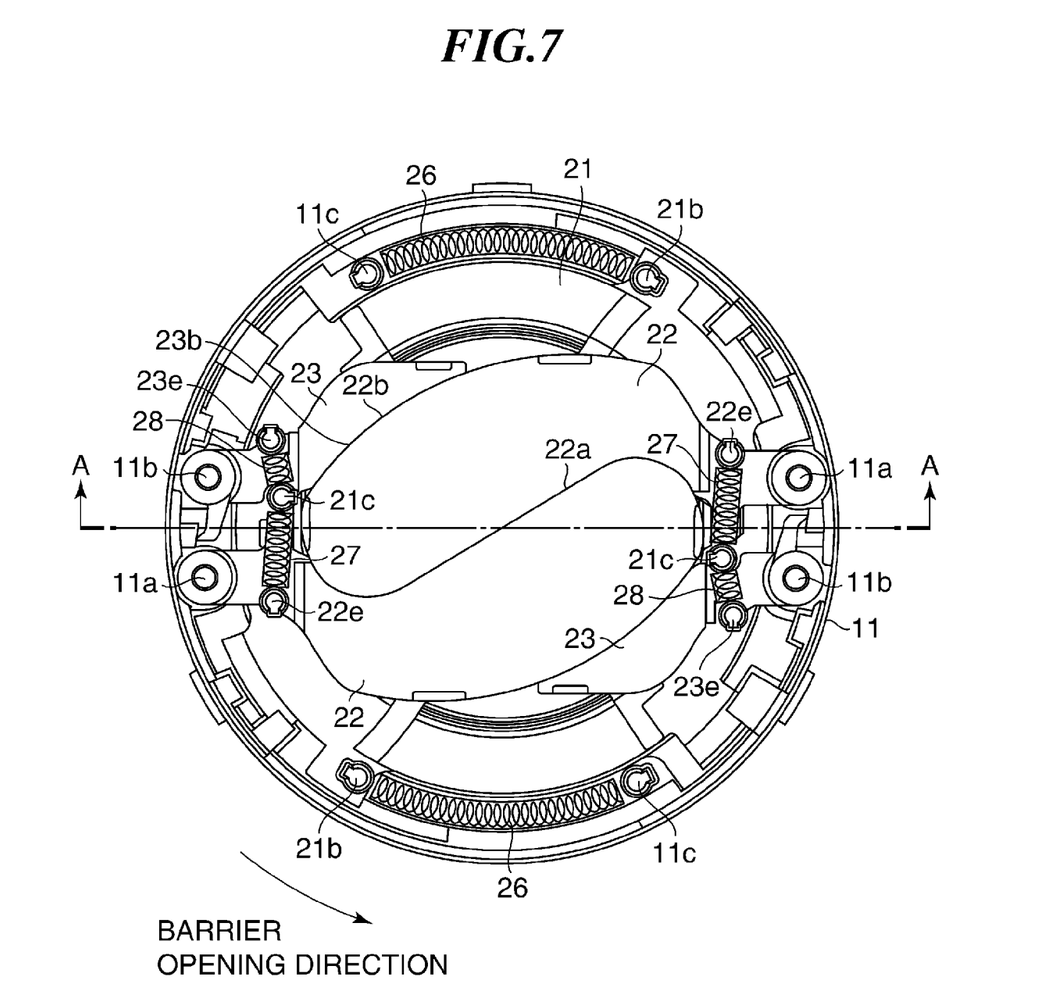
FIG. 7 is a front view showing an operation state of the barrier device where the blade members are closed.

FIG. 7 shows in front view the barrier device in a state where the blade members 22, 23 are closed.

Figure 8:
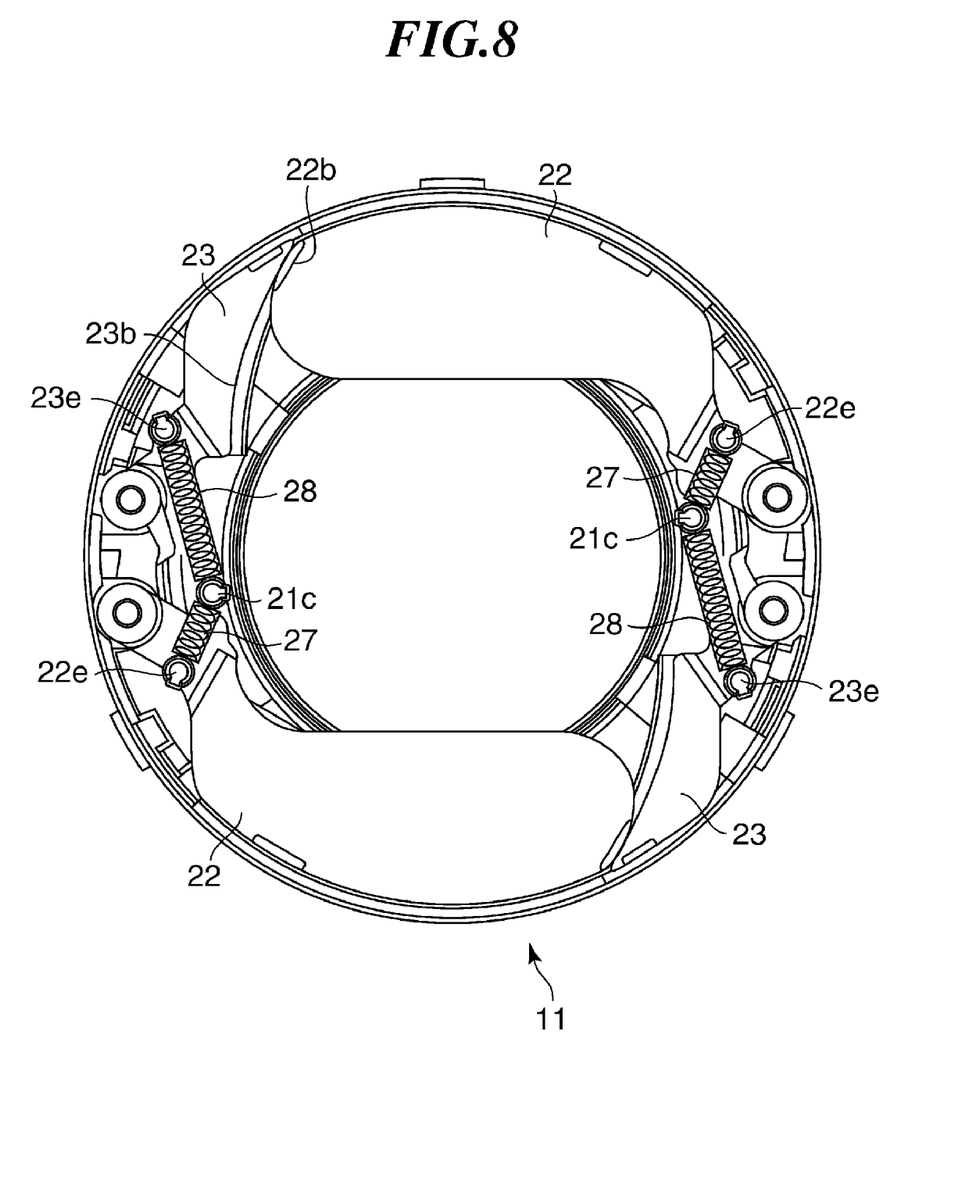
FIG. 8 is a front view showing an operation state of the barrier device where the blade members are open.

FIG. 8 shows in front view the barrier device in a state where the blade members 22, 23 are open, with an illustration of the barrier cover 24 omitted.

Figure 9:
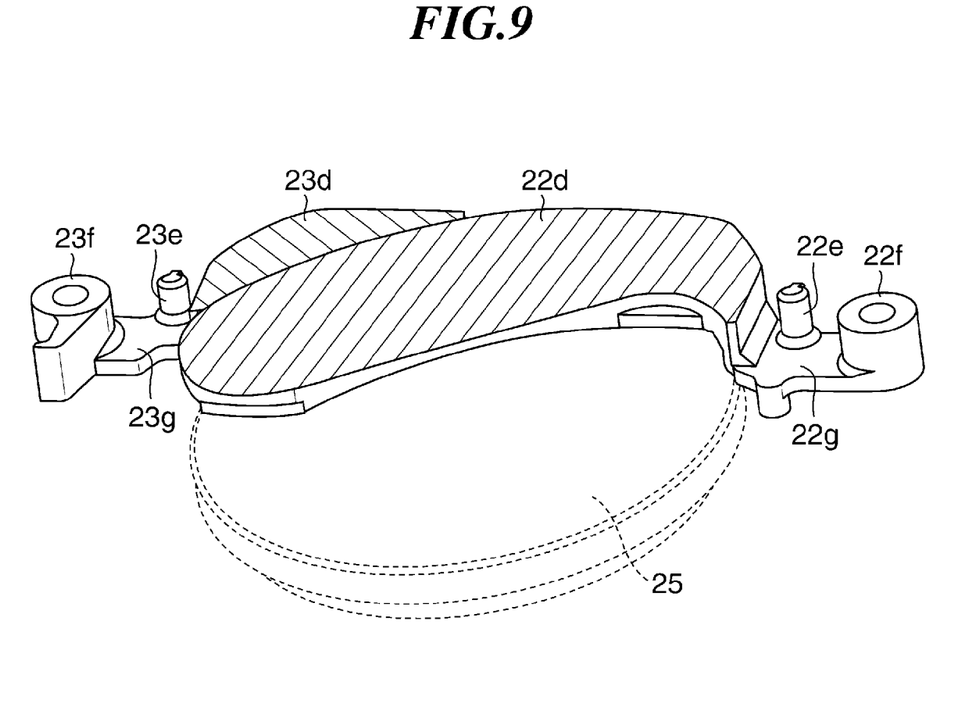
FIG. 9 is a fragmentary enlarged perspective view of the barrier blades of the barrier device.

FIG. 9 shows the barrier blades 22, 23 of the barrier device in perspective view.

Figure 10:
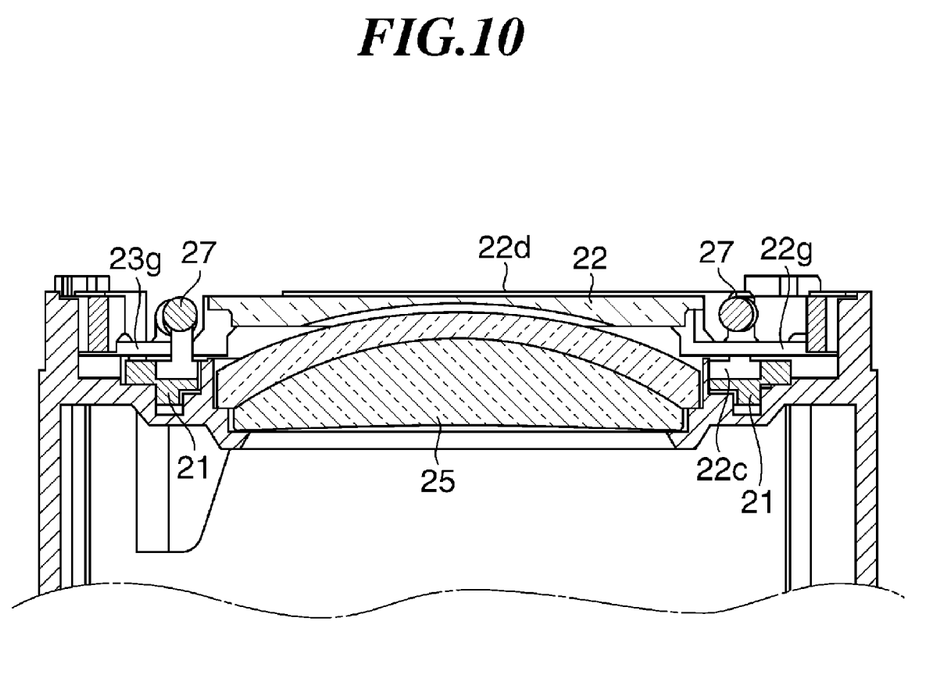
FIG. 10 is a fragmentary enlarged section view, taken along line A-A in FIG. 7, showing the barrier drive ring and the primary blade member.

FIG. 10 shows the barrier drive ring 21 and the primary blade member 22 in cross section taken along line A-A in FIG. 7.

With reference to FIG. 7, the opening/closing operation of the barrier device and means for maintaining the barrier device in a closed state are described.

When the lens barrel 10 is retracted, the barrier driving portions 13a of the cam cylinder 13 are made in contact with the manipulation tabs 21a of the barrier drive ring 21 and rotate the ring 21 in a direction to cancel urging forces of the opening springs 26, whereby the barrier device is brought into a barrier closed state.

As shown in FIG. 7, when the barrier device is in the closed state, mating surfaces 22a of the two primary blade members 22 are in contact with each other. Also, mating surfaces 22b of the primary blade members 22 are in contact with respective ones of mating surfaces 23b of the secondary blade members 23.

When the barrier device is in the closed state, the four barrier blades are maintained in a closed state by press contact by urging forces of the two sets of closing springs 27, 28 acting in barrier closing direction. In this state, the blades in contact with one another are applied with appropriate urging forces in the closing direction, and therefore an opening/closing operation failure due to, e.g., intrusion of foreign matter therebetween can be prevented.

Next, with reference to FIGS. 9 and 10, means for downsizing the barrier device is described.

As shown in FIG. 9, the primary and secondary blade members 22, 23 of the barrier device include lens shield portions 22d, 23d for covering the lens group 25. When covering the front surface of the lens group 25, front surfaces of the lens shield portions 22d, 23d form a continuous flat plane.

As shown in FIG. 10, the lens shield portion 22d of each primary blade member 22 and the closing springs 27, 28 (only the springs 27 are shown in FIG. 10) are disposed on substantially the same plane extending nearly perpendicular to the lens optical axis. It is therefore possible to reduce the length of the barrier device in the optical axis direction, whereby the barrier mechanism can be downsized.

As shown in FIG. 9, each primary blade member 22 is bent at its portion between the lens shield portion 22d and the pivot-supporting portion 22f, whereby a step and a proximal end portion 22g are formed therebetween. The spring hook 22e is formed in the proximal end portion 22g to project therefrom. Thus, the closing spring 27 for primary blade engaged with the spring hook 22e and the lens shield portion 22d are disposed on substantially the same plane extending nearly perpendicular to the optical axis (i.e., the spring 27 is disposed in flush with the lens shield portion 22d). In other words, the closing spring 27 is juxtaposed with the lens shield portion 22d as viewed in the thickness direction of the lens shield portion 22d. As a result, the length of the barrier device in the optical axis direction can be reduced, and therefore the barrier mechanism can be downsized.

Similarly, each secondary blade member 23 is bent at its portion between the lens shield portion 23d and the pivot-supporting portion 23f, whereby a step and a proximal end portion 23g are formed therebetween. The spring hook 23e is formed in the proximal end portion 23g to project therefrom. Thus, the closing spring 28 for secondary blade engaged with the spring hook 23e and the lens shield portion 23d are disposed on substantially the same plane extending nearly perpendicular to the optical axis, so that the closing spring 28 is juxtaposed with the lens shield portion 23d as viewed in the thickness direction of the lens shield portion 23d, whereby the length of the barrier device in the optical axis direction can be reduced to downsize the barrier mechanism.

Next, a description will be given of means for achieving an appropriate stable opening/closing operation of the barrier device with reduced spring forces of the opening springs 26 and closing springs 27, 28, i.e., with a relatively small drive load.

In the barrier device, spring forces of the opening springs 26 and closing springs 27, 28 (all of which are tension springs) are utilized for the opening/closing operation of the primary and secondary blade members 22, 23.

When the barrier device is shifted from its closed state to open state, the cam cylinder 13 held at its closed position against urging forces of the opening springs 26 is rotated in conjunction with ejection of the lens barrel 10. With the rotation of the cam cylinder 13, the barrier drive ring 21 is rotated in the barrier opening direction (anticlockwise direction in FIGS. 4, 6 and 7) by the urging forces (torque) of the opening springs 26.

With the rotation of the drive ring 21, the contact surfaces 21d formed in the ring 21 are brought into contact with the drive pins 22c of the primary blade members 22. With a further rotation of the ring 21, the primary blade members 22 are rotated in their opening direction (clockwise) around the pivots 11a.

With the progress of the opening operation of the primary blade members 22, the contact surfaces 23b of the secondary blade members 23 are slid on the contact surfaces 22b of the primary blade members 22 such that the secondary blade member 23 are rotated around the pivots 11b in their opening direction (anticlockwise).

To ensure that the barrier blades are changed from the closed state to open state, the spring force of each opening spring 26 and the combined spring force of each closing spring pair 27, 28 must properly be set.

In the barrier device, a rotational torque produced by the spring forces of two opening springs 26 acting on the barrier drive ring 21 in barrier opening direction is set to be larger than a rotational torque produced by the combined spring forces of two sets of closing springs 27, 28 acting thereon in barrier closing direction.

In a conventional barrier device described in, e.g., Japanese Laid-open Patent Publication No. 2001-83575, a rotational torque of two opening springs acting on a barrier drive ring varies as shown by T1' in FIG. 11 with rotation of the ring, and spring forces of two closing springs respectively acting on two main blades (hereinafter referred to as the rotational torque of the two closing springs acting on the ring) varies as shown by T2' in FIG. 11 with rotation of the ring.

Figure 11:
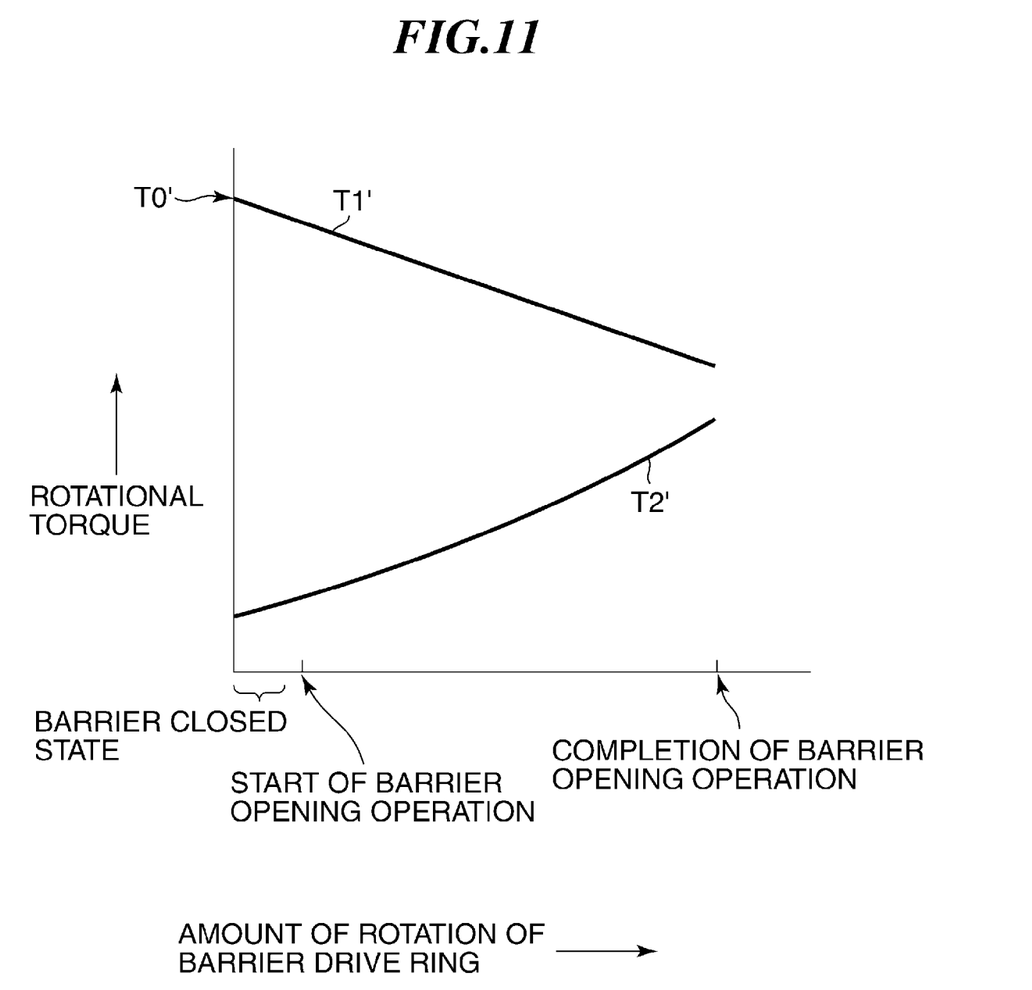
FIG. 11 is a graph showing example variations in loads applied to a closing spring and an opening spring when blade members are opened and closed in a conventional barrier device.

In the conventional barrier device, the two closing springs are charged with the progress of barrier opening operation, as shown in FIG. 11. Accordingly, the rotational torque T2' of the closing springs acting on the barrier drive ring in closing direction reaches its maximum when the barrier device is in a barrier fully open state.

The opening springs for achieving barrier opening operation against the closing torque T2' must be configured to generate spring forces large enough to produce an opening torque T1' that overcomes the closing torque T2'.

The barrier device configured to generate a rotational torque T1' able to overcome the rotational torque T2' of the closing springs over the entire range of opening/closing operation inevitably generates a large initial torque T0' of the opening springs in a barrier fully close state.

Figure 12:
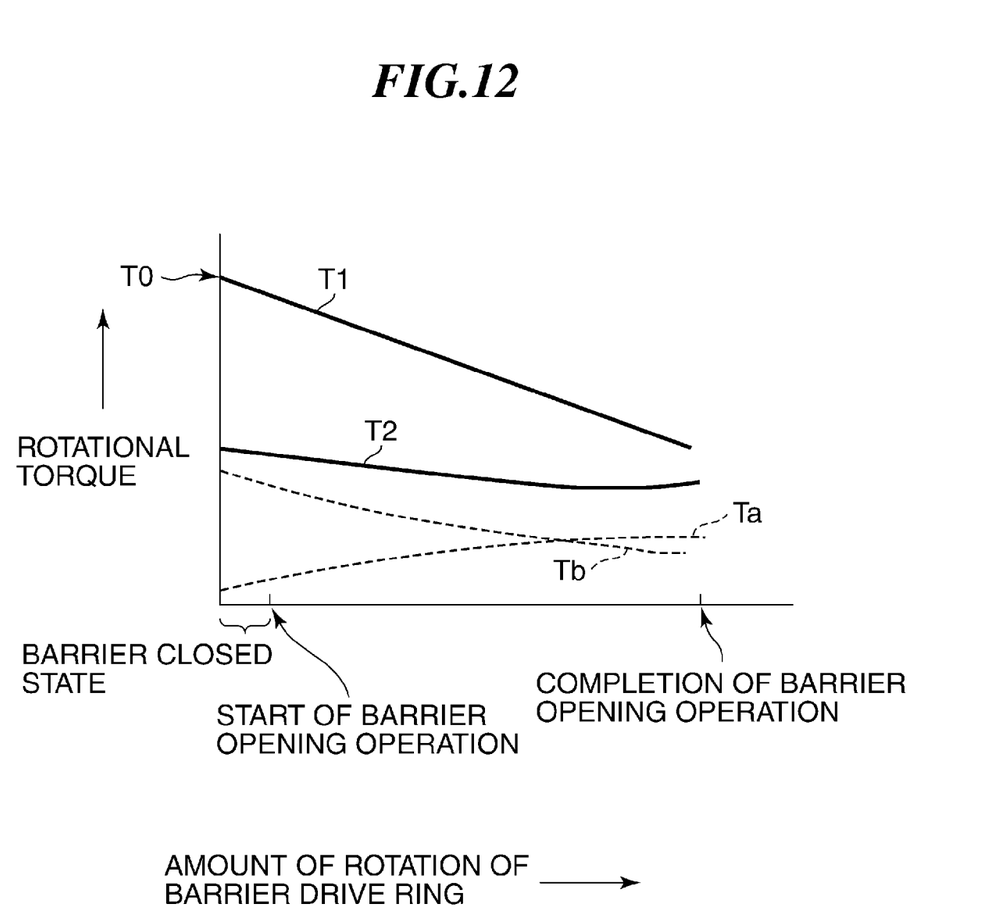
FIG. 12 is a graph showing example variations in loads applied to the closing spring and the opening spring when the blade members are opened and closed in the barrier device according to the one embodiment of this invention.

On the other hand, in the barrier device of this embodiment, a rotational torque T1 produced by spring forces of the opening springs 26 acting on the barrier drive ring 21 and a rotational torque T2 produced by respective combined spring forces of two sets of closing springs 27, 28 acting on the ring 21 vary with the rotation of the ring 21 as shown in FIG. 12.

In the barrier device of this embodiment, when a shift is made to barrier fully open state, the spring hooks 21c, with each of which respective one ends of the corresponding closing springs 27, 28 are engaged, rotationally move in barrier opening direction with the progress of the barrier opening operation. Thus, with the progress of barrier opening operation, the spring force of each closing spring 27 decreases and the spring force of each closing spring 28 does not greatly increase.

During the shift to barrier fully open state, the closing springs 28 are pulled and their spring forces increase, but the rotational torque (shown by Ta in FIG. 12) of the closing springs 28 acting on the secondary blade members 23 does not largely increase due to the fact that an angle formed between the longitudinal direction of each secondary blade member 23 and the axial direction of the corresponding closing spring 28 is considerably small, and so on, the angle being determined by a positional relation between pivotal center of the secondary blade member 23 and spring hooks 21c, 23e for the closing spring 28, a moving locus of a contact point between the blade members 22, 23 along curved contact faces of the blade members 22, 23, etc.

During the shift to barrier fully open state, the distance between spring hooks 21c, 22e for each closing spring 27 for primary blade decreases, and therefore, the spring forces and hence rotational torque (shown by Tb in FIG. 12) of the closing springs 27 decreases.

As shown in FIG. 12, with the barrier device of this embodiment, the rotational torque T2 (=Ta+Tb) generated by respective combined spring forces of two sets of closing springs 27, 28 does not become extremely large, especially in the barrier fully open state, and the rotational torque T2 during the opening/closing operation is equalized.

As a consequence, the rotational torque T1 of the two opening springs 28 can be made small, which is to be applied to the barrier drive ring 21 in order to overcome the rotational torque T2 of the two sets of closing springs 27, 28 acting on the ring 21.

With the barrier device of this embodiment, it is therefore possible to reduce drive loads applied at the barrier opening/closing operation and suppress an occurrence of a faulty barrier opening/closing operation due to, e.g., deformation of barrier device components by being applied with a large urging force from the opening spring 26 or closing spring 27, 28. Accordingly, it is possible to suppress the increase of lens barrel driving load applied when the lens barrel is moved at barrier opening/closing operation and occurrences of a faulty barrier opening/closing operation due to any of barrier components being twisted, which are found in the conventional barrier device.

More specifically, the barrier device of this embodiment is configured to permit the barrier drive ring 21 to be pivoted relative to the primary blade members 22 in a predetermined range at the start of barrier opening operation. That is to say, at the start of barrier opening operation, the barrier drive ring 21 starts to rotate in the barrier opening direction from a state shown in FIG. 6 where the contact surfaces 21d of relative movement permission portions 210 are apart from the drive pins 22c of the primary blade members 22. Until the contact surfaces 21d are made in contact with the drive pins 22c, the barrier drive ring 21 alone is rotated.

As a result, the distance decreases between each of the spring hooks 21c provided on the barrier drive ring 21 and the spring hook 22e, which remains stationary, of the corresponding primary blade member 22, and hence amounts of elastic deformation of the closing springs 27 for primary blade decrease, resulting in decreased urging forces of the closing springs 27.

On the other hand, the distance increases between each of the spring hooks 21c on the barrier drive ring 21 and the spring hook 23e, which remains stationary, of the corresponding secondary blade members 23, and hence amounts of elastic deformation of the closing springs 28 for secondary blade increase, resulting in increased urging force of the closing springs 28.

With a further pivotal motion of the barrier drive ring 21 in the barrier opening direction, the contact surfaces 21d of the relative movement permission portions 210 of the ring 21 are in contact with the drive pins 22c of the primary blade members 22 and then pivot the blade members 22 around the pivots 11a in opening direction, whereby each of the spring hooks 22e is moved radially outward from its position shown in FIG. 6 where it is disposed in line with the spring hook 21c and the drive pin 22c. As a result, the distance between the spring hooks 21c, 22e decreases and therefore the amount of elastic deformation, i.e., the urging force of the closing spring 27 for primary blade decreases.

With the above pivotal motion of the blade members 22 in the opening direction, the secondary blade members 23 are pivoted around the pivots 11b in opening direction and therefore each of the spring hooks 23e is moved radially outward from its position shown in FIG. 6. As a result, the distance between the spring hooks 21c, 23e increases and therefore the amount of elastic deformation, i.e., the urging force of the closing spring 28 for secondary blade increases.

The barrier device is configured to vary the urging forces (spring forces) of the closing springs 28 for secondary blade in a range where they do not hinder the primary blade members 22 from being opened, and make the rotational torque (shown by T1 in FIG. 12) of the opening springs 26 acting on the barrier drive ring 21 in the opening direction greater than the combined rotational torque (shown by T2 (=Ta+Tb) in FIG. 12) of the two sets of closing springs 27, 28 for primary and secondary blades.

With the barrier device, the urging forces of the closing springs 28 for pivoting the small secondary blade members 23 are made smaller than the urging forces of the closing springs 27 for pivoting the large primary blade members 22. As a result, the two sets of the closing springs 27, 28 are prevented from generating an extremely large rotational torque T2 especially in the barrier fully open state, and the rotational torque T2 during the opening/closing operation is equalized.

With the barrier device, the urging forces of the two opening springs 26 for the opening operation can be made small to correspond to the decreased and equalized rotational torque T2 of two sets of closing springs 27, 28.

Accordingly, it is possible to suppress the increase of lens barrel driving load for moving the lens barrel for the barrier opening/closing operation and occurrences of a faulty barrier opening/closing operation due to any of barrier components being twisted.

In short, according to the present invention, there are provided first and second blade members (primary and secondary blade members 22, 23) adapted to be pivotable between closed positions to cover a lens surface and open positions to expose the lens surface, a drive member (barrier drive ring 21) adapted to be pivotable relative to the first and second blade members, and first and second urging members (closing springs 27, 28 for primary and secondary blades). The drive member has first and second engagement portions (small-diameter and large-diameter shaft portions of the spring hook 21c). The first urging member has one end thereof engaged with the first engagement portion and another end thereof engaged with the first blade member, and is adapted to apply the first blade member with an urging force when the drive member is pivoted to move the first engagement portion relative to the first blade member. The second urging member has one end thereof engaged with the second engagement portion and another end thereof engaged with the second blade member, and is adapted to apply the second blade member with an urging force when the drive member is pivoted to move the second engagement portion relative to the second blade member. The barrier device can be configured that the urging force produced by the first urging member decreases when the drive member is pivoted to pivot the first and second blade members from the closed positions to the open positions.

As a result, the urging forces of the opening springs 26 for the opening operation can be made small, and it is therefore possible to suppress the increase of lens barrel driving load for the barrier opening/closing operation and occurrences of a faulty barrier opening/closing operation due to any of barrier components being twisted.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-200996, filed Aug. 4, 2008, which is hereby incorporated by reference herein in its entirety.

What is claimed is:

1. A barrier device for a camera, comprising:
first and second blade members adapted to be pivotable between closed positions to cover a lens surface and open positions to expose the lens surface;

a drive member having an engagement portion disposed pivotable with respect to the first and second blade members;

a first urging member having one end thereof engaged with the engagement portion and the other end thereof engaged with said the first blade member;

a second urging member having one end thereof engaged with the engagement portion and the other end thereof engaged with the second blade member;

a third urging member adapted to apply a rotating force to said drive member in opening directions of the first blade member and the second blade member, wherein the first blade member is urged by the first urging member in a closing direction of the first blade member, the second blade member is urged by the second urging member in a closing direction of the second blade member, the urging force of the third urging member with respect to the opening direction is larger than the combined urging force by the first urging member and the second urging member with respect to the closing direction, the engagement portion is movably driven in the opening direction when the first blade member and the second blade member are pivotably moved in the opening directions, and the engagement portion is movably driven in the closing direction when the first blade member and the second blade member are pivotably moved in the closing directions.

2. The barrier device according to claim 1, wherein the urging force produced by said first urging member decreases when said drive member is moved to pivot said first and second blade members from the closed positions to the open positions.

3. The barrier device according to claim 1, wherein said first and second urging members are disposed on a substantially same plane as a plane on which said first and second blade members are disposed and which extends substantially perpendicularly to a lens optical axis direction.

4. The barrier device according to claim 1, wherein said first and second urging members are disposed on object-sides of said first and second blade members.

5. The barrier device according to claim 1, wherein said first and second urging members are each constituted by a coil spring.

6. The barrier device according to claim 1, wherein the urging force of the first urging member is smaller than the urging force of the second urging member.

7. The barrier device according to claim 1, wherein when the first blade member and the second blade member are opened or closed, one of the first urging member and the second urging member is elongated and the other of the first urging member and the second urging member is contracted.

8. A camera having the barrier device according to claim 1.

* * * * *